Figure 4:
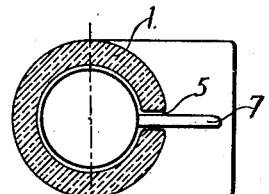

Aug. 5, 1947.   W. S. TANDLER   2,425,271
COOKING STOVE
Filed Dec. 13, 1943   2 Sheets-Sheet 1

INVENTOR
WILLIAM S. TANDLER
BY
ATTORNEY

Aug. 5, 1947.　　　W. S. TANDLER　　　2,425,271
COOKING STOVE
Filed Dec. 13, 1943　　　2 Sheets-Sheet 2

INVENTOR
WILLIAM S. TANDLER
BY
ATTORNEY

Patented Aug. 5, 1947

2,425,271

UNITED STATES PATENT OFFICE 2,425,271

COOKING STOVE

William S. Tandler, New York, N. Y.

Application December 13, 1943, Serial No. 514,135

1 Claim. (Cl. 219—35)

This invention relates to cooking stoves to be used for both electric and fuel heating, but preferably electric heating.

Some modern cooking stoves are now provided with heating wells or pits into which the cooking vessel is inserted.

It is this type of cooking arrangement with which this invention is mainly concerned.

It is the chief object of this invention to improve the heat economy of the stove and to reduce the power or fuel consumption and thereby the cost of its operation.

It is also an object of the invention to prevent and to eliminate the tipping or throwing over of the cooking utensils.

It is another vital object of the invention to increase the safety factor of the stove and to reduce the danger of burns and similar injuries, particularly where children are concerned.

It is another object of the invention to facilitate the ease of handling all cooking utensils while using all the advantages of cooking in a well or pit.

It is another object of the invention to hold the vessels firmly, to facilitate manipulations, such as stirring and mixing and to provide a firm support of the pot for automatic stirring and mixing means.

It is an important object of the invention to facilitate the cleaning of the stove and particularly of the heating wells and to maintain a pleasant exterior and a sanitary operation of the stove.

It is another object of the invention to eliminate the influence of the stove operation on the surrounding atmosphere, to prevent overheating of the operating room or kitchen.

It is a further object of the invention to provide a stove which can be manufactured from any suitable material which in spite of its inexpensiveness presents a pleasant shape and design, has large working space and ample storage capacity.

With these and other objects in view which will become apparent as this specification proceeds, the invention including its various features and advantages is described hereunder and illustrated in the attached drawings by way of example in some of its preferred embodiments.

Figure 3:
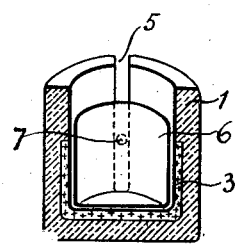
Figure 2:
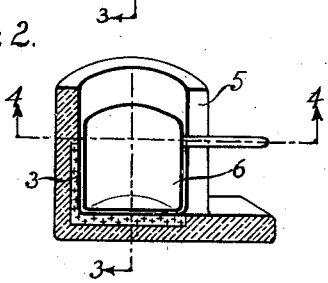
Figure 5:
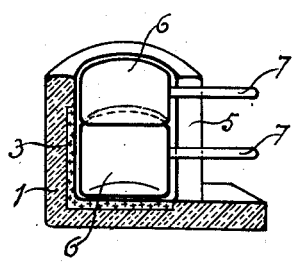
Figure 6:
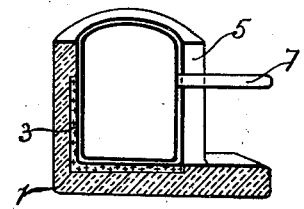
Figure 1:
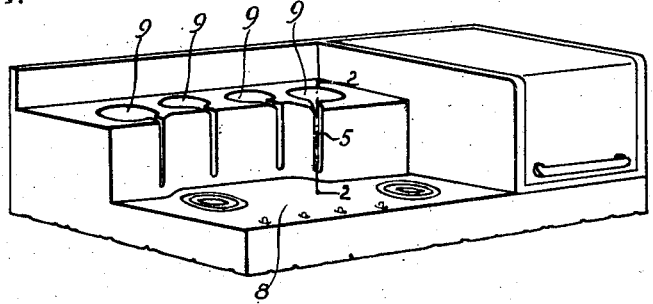
Figure 7:
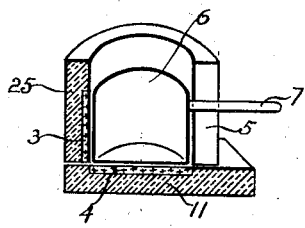
Figure 8:
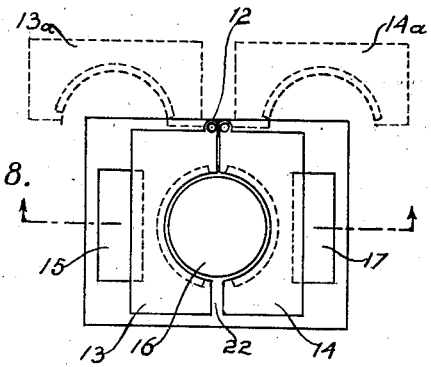
Figure 9:
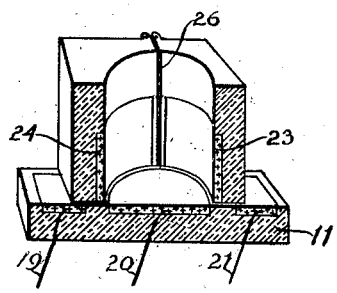

In the drawings, where same numerals identify identical elements,

Fig. 1 is a perspective front view of a part of a stove provided with four heating wells constructed in accordance with the principles of the invention, Fig. 2 is a vertical sectional view of a well on an enlarged scale taken substantially along the line 2—2 of Fig. 1 with a cooking utensil located in the well, Fig. 3 is a vertical sectional view taken along line 3—3 of Fig. 2, Fig. 4 is a horizontal sectional view taken along line 4—4 of Fig. 2, Fig. 5 and Fig. 6 are vertical sectional views similar to Fig. 2 illustrating the location of differently shaped cooking utensils in the well, Fig. 7 is a vertical sectional view similar to Fig. 2 of a further modification of the well having a removable upper portion, Fig. 8 and Fig. 9 are a top view and a vertical sectional view of another modification of the invention provided with means for the displacement of the upper portion.

Referring now in detail to the exemplification of the invention shown in the drawings the stove illustrated in Fig. 1 is provided with four heating wells 9 which are arranged as to create a working space 8 in front of the wells.

The wells are provided with an insulating jacket 1, Fig. 2, which may be metal clad or glazed on the inside for better cleaning. The jacket is preferably cylindrically shaped and either forms an integral closed unit with the bottom, as shown in Figs. 2 to 6, or it is open at the bottom as shown in Figs. 7 to 9, in which case a separate bottom portion 11 is provided.

A heater element 3 preferably of the electric type is inserted in the insulating jacket in a suitable manner; this heating element extends through the lower part of the cylindrical jacket 1 and through the bottom portion thereof; it may, as shown in Fig. 7, consist of independent units 3, 4, the one inserted in the vertical walls of the jacket and the other one in the bottom portion 11.

A characterizing element of the invention is the slotted construction of the side walls of the well or of the insulating jacket 1 forming these side walls.

It is known to provide short vertical slots in the front wall of cooking stoves through which the controlling levers of the heating unit extends.

The purpose and the construction of the vertical slots 5 used in conjunction with this invention is entirely different, as explained in the following.

In order to handle the cooking vessels and particularly to lower them into the wells and to lift them therefrom, these vessels must be provided with a handle.

Handles are usually provided at the upper edge of pots or else it would be impractical to insert them into heating wells. This location of the handles, however, causes exceedingly grave handling complications, and it is the main reason why the provision of the very efficient heating wells has not progressed at a more rapid rate.

The above referred to top location of the handles forces the operator to keep his hands above the heated well when handling the cooking vessel and, therefore, makes the operation insecure and dangerous.

If, to overcome this difficulty, the handles are mounted at the sides of the vessel, the latter could only be lowered into the wells to a limited extent. This drawback might be remedied by mounting on the vessels upwardly extending long handles which, however, renders the manoeuvering of the cooking utensils very difficult and would complicate the use of the cover.

All these grave complications are eliminated by this invention which affords the advantage that the handle may be mounted at any place at the side of the vessel and, nevertheless, permits an operation of the vessel from the side without the operator being forced to manoeuver the same from above.

In order to realize this greatly improved handling of the cooking vessels a vertical slot is provided in the side walls of the wells or their insulating jacket 1 extending from and through the upper edge of the well walls substantially down to its bottom.

All the above recited difficulties are successfully eliminated by having the handle located at the side of the cooking utensils anywhere between the upper edge and the bottom and extending through the vertical slot of the well wall. In this manner the pot may be lowered into the well by lateral handling in contradistinction to manoeuvering the same from above. The pot can be located in the well at any lower or higher place; the contents of the pot can be stirred without changing the location of the same; the operator is safe from danger of injury by tipping; a main advantage is the heat economy, as the pot is not only heated from the bottom, whereby the heat may escape, but the heat being concentrated and kept around the pot by the insulated jacket design allowing a through contact between cooking vessel and heater, as the slot allows the pot to be inserted completely and to touch the bottom heater. The vessel is prevented from tipping over because it is firmly held in the jacket. The insulation around the vessel prevents heat from escaping and overheating the surrounding locality. The pot can be easily inserted and removed; the jacket can be cleaned and maintained clean without difficulty.

The invention is not dependent upon the cylindrical form of the well which may be square or otherwise shaped; any cooking vessel may be used as long as it is provided with a laterally extending handle passing through the slot 5 and being guided thereby when the vessel is lowered into the well.

It is desirable, although not necessary, to have a reasonably close fit between the cooking vessel and the jacket, and therefore a range will provide for a number of units of different diameters to accommodate various sizes of pots. These vessels may be high or low, but in every case they will utilize the full economy and safety of the instant heating system by making contact with the bottom heater element. The cylindrical heating element is an additional source of heat, which in the individual designs may be omitted or provided with a separate switch.

It is essential that slot 5 reaches substantially to the bottom of the unit so that even the shallowest vessel can be used; at the same time the unit can be easily and perfectly cleaned by rinsing the same and using the slot as an outlet through which the rinsing water is discharged.

In Figures 5 and 6 vessels of varying height are shown to be inserted in the walls; it is also possible to put one pot on top of another, for instance, for the purpose of keeping food warm or in readiness.

Fig. 7 shows an arrangement which is a slight modification of the one described above and offers particular advantages.

In this case the insulating jacket is divided into two parts, viz. an upper cylindrical portion 25 and a substantially flat bottom portion 11; the upper portion may be made removable. In this manner the bottom portion 11 may be used as a heater plate without utilizing the device in its capacity as a well, or, if the upper or cylindrical portion 25 is put in its proper operating place, as a well.

The advantage of this arrangement will best be realized by providing in the stove a plurality of wells for pots of different diameter and in addition thereto one well with the above described removable top portion which, therefore will allow the use of oversized pots; in this manner, though without the benefit of a jacket and by the same arrangement, the lower heating plate after displacement of the top portion from the operating space of the well becomes available as a heating plate or griddle without extra expense and without waste of space.

Various devices may be envisaged for the removal or displacement of the top portion.

In the arrangement shown in Figures 8 and 9, hinges are used for this purpose. The cylindrical top portion of the jacket is divided into two halves 13, 14. At the one dividing plane 26 hinges 12 are provided, and the substantially semi-cylindrical parts 13, 14 may be swung about these hinges 12 out of the operating position and into positions 13a, 14a, shown in Fig. 8 in dotted lines.

The bottom portion 11 may be provided with three heater elements, two of them, 15, 17, of rectangular shape and one, 16, of circular shape, which may be supplied by electric cables 19, 20, 21, respectively.

The arrangement is such that at the place where the hinge 12 is located the semi-cylindrical parts 13, 14 close tightly; but at the dividing plane opposite the hinges they do not close completely, whereby a slot 22 is created leaving room for the manipulation of the handle of the pot.

By using the parts 13, 14 in the position as indicated in full lines in Figure 8 and by operating only heater element 20, normal well cooking can be performed whereby it is understood that the jacket may also be provided with two independent heater elements 23 and 24 for higher efficiency.

If, however, the jacket wings 13 and 14 are swung back into position 13a and 14a, shown in dotted lines, then plate 11 may be used for an oversized pot or as a griddle with the optional use of heater elements 15, 16 and 17, singly or combined.

Modifications and variations may be made within the invention and parts of the improvement may be used without others.

I claim:

In a cooking stove a cylindrical heating well, a cylindrical heat insulating jacket surrounding the operating space of said well, said jacket being divided into an upper portion forming the side wall of the well and a flat bottom portion, heat sources in the wall and in the bottom, said well being sufficiently deep to accommodate normal cooking vessels below its top, said upper portion being divided in halves, means at the one dividing plane to rotate said halves, the latter ending short at the opposite dividing plane to form a vertical slot extending from and through the upper edge of said top portion substantially to said bottom portion to lower a handle provided cooking vessel below the top of said well onto said bottom, said slot being arranged in the front portion of said well wall to manipulate the vessel from the front face of the stove.

WILLIAM S. TANDLER.

REFERENCES CITED

The following references are of record in the file of this patent:

UNITED STATES PATENTS

| Number | Name | Date |
|---|---|---|
| 638,924 | Halm | Dec. 12, 1899 |
| 1,056,933 | Perkins | Mar. 25, 1913 |
| 1,321,649 | Lightfoot | Nov. 11, 1919 |
| 1,717,132 | Weinmann | June 11, 1929 |
| 1,805,716 | Clawson | May 19, 1931 |
| 2,025,899 | Rhodes | Dec. 31, 1935 |
| 2,078,650 | Clark | Apr. 27, 1937 |
| 2,194,820 | Connell et al. | Mar. 26, 1940 |
| 2,257,580 | Trompeter | Sept. 30, 1941 |

FOREIGN PATENTS

| Number | Country | Date |
|---|---|---|
| 336,819 | Italy | Feb. 22, 1936 |